United States Patent [19]

Zimmerman

[11] 4,021,061

[45] May 3, 1977

[54] SELF-LOCKING COUPLING

[75] Inventor: Harry M. Zimmerman, Coronado, Calif.

[73] Assignee: Reed Irrigation Systems, Inc., El Cajon, Calif.

[22] Filed: Apr. 10, 1975

[21] Appl. No.: 566,689

[52] U.S. Cl. .................................. 285/13; 285/255
[51] Int. Cl.² ...................................... F16L 55/00
[58] Field of Search ............ 285/242, 255, 243, 13, 285/14

[56] References Cited

UNITED STATES PATENTS

| 367,790 | 8/1887 | Darrah, Jr. | 285/242 |
| 3,693,657 | 9/1972 | Olson | 137/608 |

FOREIGN PATENTS OR APPLICATIONS

| 40,898 | 1932 | France | 285/243 |
| 1,535,688 | 1968 | France | 285/255 |

Primary Examiner—Andrew V. Kundrat
Attorney, Agent, or Firm—Owen, Wickersham & Erickson

[57] ABSTRACT

A coupling device for connecting hoses or flexible conduits to each other or to other fittings comprises a male member with an enlarged end portion having a plurality of conical stages and an annular female member or locking sleeve that is retained on the male member and shaped to grip and seal an end of a hose or conduit inserted between the sleeve and the male member.

6 Claims, 17 Drawing Figures

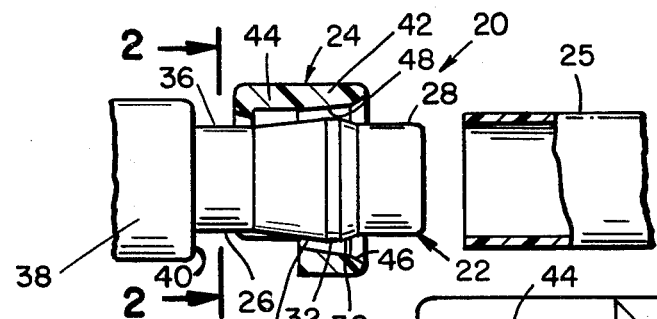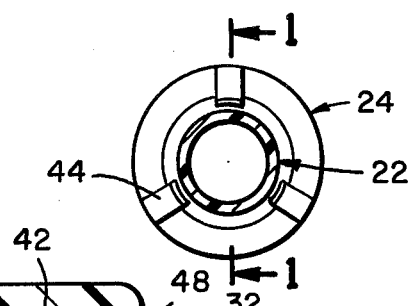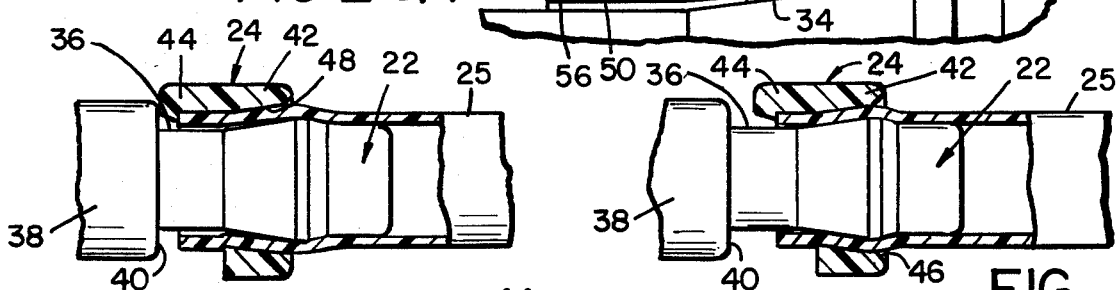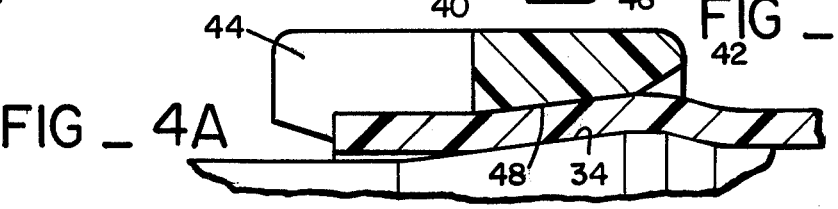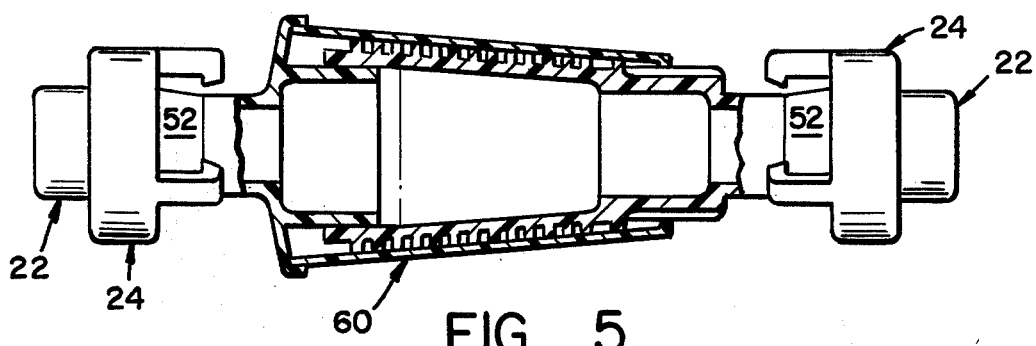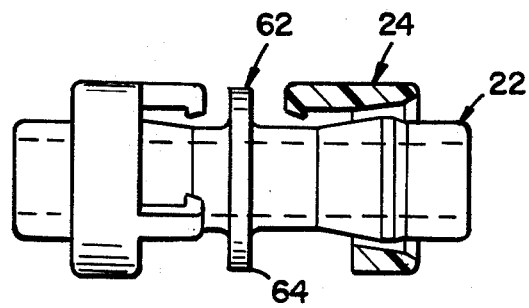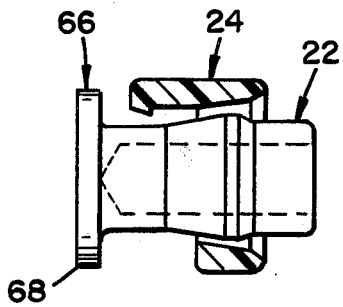

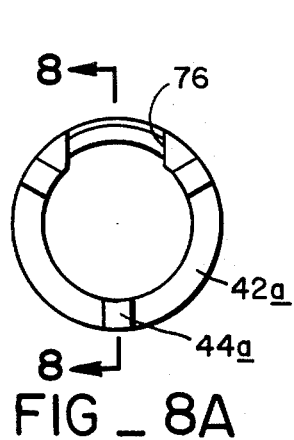
FIG_8A
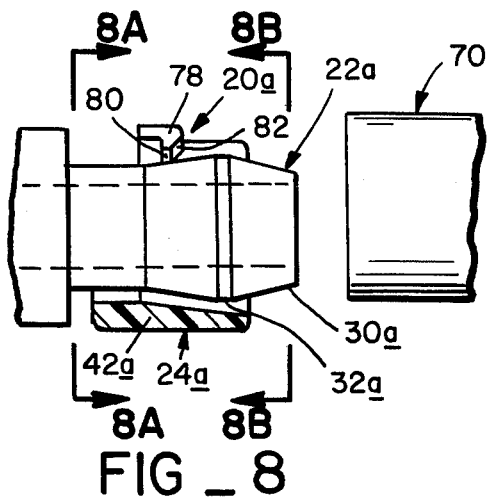
FIG_8
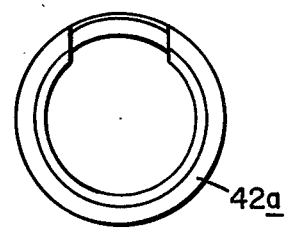
FIG_8B
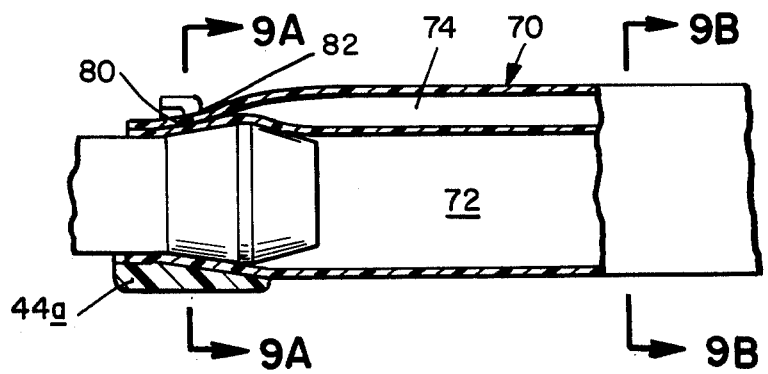
FIG_9
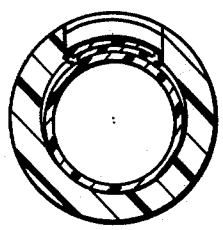
FIG_9A
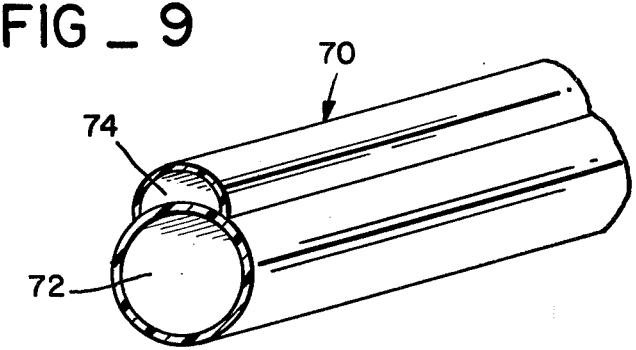
FIG_9B
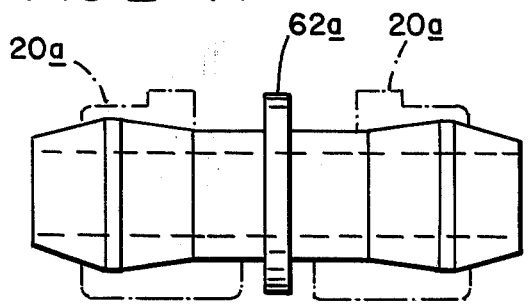
FIG_10
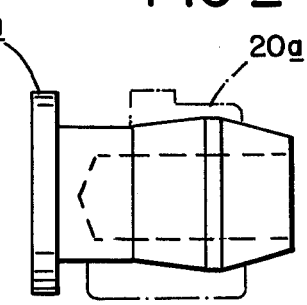
FIG_11

SELF-LOCKING COUPLING

BACKGROUND OF THE INVENTION

This invention relates to coupling or connector devices for hoses and conduits and more particularly to an improved coupling for interconnecting flexible conduits such as plastic hose or tubing, as used in irrigation systems.

In one common form of drip irrigation system water is supplied from a central source through thin-walled plastic tubing to a multiplicity of in-line emitters which allows for a drip-like flow of water or to similar side branching emitters connected to a tee-type fitting. The emitters are spaced apart at predetermined intervals in the conduit so as to be at or near the roots of the plants being irrigated.

As shown in U.S. Pat. No. 3,693,657, most emitters heretofore devised had extended barb-type connector portions to facilitate their connection with the water carrying conduit or plastic tubing. Although such barb-type connectors were used extensively they had several serious disadvantages. In the first place the barb connector was designed to have a significantly larger diameter than the inside plastic conduit diameter. Thus, the standard procedure for installing an emitter required that the end portion of the conduit or tubing be heated so that it would expand slightly while being forced onto the barb. Where many hundreds or even thousands of emitters are installed in a typical drip irrigation system, this necessity to heat the conduit in order to connect it to an emitter or fitting entailed a substantial amount of added time and labor. Moreover, once installed, the plastic conduit as it cooled, was under a constant tension stress. Over a period of time this stress often caused a tendency for the conduit to crack and eventually this stress-cracking caused a failure or leak. A further disadvantage with the prior art barb-type connectors arose when it became necessary to remove or replace an emitter which may have become clogged or otherwise inoperative. Heretofore, it was necessary to cut the conduit or tubing near the emitter and then reheat the conduit end portion in order to re-connect it to the new emitter. This procedure was not only time consuming but also wasteful of conduit.

BRIEF SUMMARY OF THE INVENTION

A general object of the present invention is to provide a coupling or connector that overcomes the aforesaid problems and disadvantages of prior art coupling such as the barb-type connector.

Another object of the invention is to provide a coupling that makes it possible to interconnect a flexible conduit or hose with another such conduit or a fitting or emitter in a simple and rapid manner without the need for heating the conduit or for special tools or extraordinary skill.

Yet another object of my invention is to provide a coupling for flexible conduit that is particularly well adapted for ease and economy of manufacture.

Still another object of my invention is to provide a coupling comprised of relatively movable male and female members which are normally retained together so they will not be separated before or after installation, and also a coupling which is shaped so that the proper placement of the conduit between the members during its installation can be readily observed.

A further object of my invention is to provide a coupling which, when installed, causes a compressive sealing force on the hose or conduit rather than a tensile force, thereby eliminating the tendency for the conduit material to crack.

Yet another object is to provide a coupling wherein the fluid pressure within the conduit or tension on the conduit serves to increase the sealing effect of the female member.

The aforesaid objects are accomplished by a coupling having a rigid or semi-rigid tubular male member that may be integrally attached at one end as part of a fitting such as an in-line coupler or emitter. Near the end of the male member is an enlarged circumferential portion having a series of conical stages with different degrees of taper. Cooperating with the male member is a rigid female member which is essentially an annular sleeve having an inner conical surface. Extending from the sleeve are a plurality of circumferentially spaced apart projections that serve to retain the female member loosely on the male member when the connector is not in use. A hose or conduit is attached to the connector by pushing it through an annular gap between the female sleeve portion and the enlarged male portion. Due to a wedging action created by the inside sleeve surface and one conical surface on the male member increased water pressure within the hose or conduit or pulling on the hose causes the female sleeve to press tightly against the hose and seal it against the enlarged portion of the male connector member. An alternate form of the connector accommodates a particular type of conduit having a secondary compartment extending along one side thereof. In this embodiment the sleeve member has an arcuate cutout section with a radially extending bearing surface that forms an edge for exerting a pinching action on the secondary compartment of the dual compartment conduit.

Other objects, advantages and features of the invention will become apparent from the following detailed description of different preferred embodiments thereof presented in conjunction with the accompanying drawing.

BRIEF DESCRIPTION OF THE DRAWING

FIG. 1 is a view in elevation and partly in section of a connector according to a first embodiment of the present invention;

FIG. 2 is a view in section taken at line 2—2 of FIG. 1;

FIG. 3 is a view in elevation and in section showing the connector of FIG. 1 after a conduit has been installed but before pressure within the conduit has been applied;

FIG. 3A is an enlarged fragmentary view of FIG. 3;

FIG. 4 is a view of the connector similar to FIG. 3A after the internal conduit pressure has been applied;

FIG. 4A is an enlarged fragmentary view of FIG. 4;

FIG. 5 is a view in elevation and in section showing a drip type emitter utilizing connectors according to the invention;

FIG. 6 is a tubular conduit coupler comprised of connectors according to the invention;

FIG. 7 is an end plug for a conduit utilizing my connector;

FIG. 8 is a view in elevation and partly in section showing a connector according to the principles of the present invention that is particularly adapted for use with a dual compartment irrigation conduit;

FIG. 8A is a view in section taken at line 8A—8A of FIG. 7;

FIG. 8B is a view in section taken at line 8B—8B of FIG. 7;

FIG. 9 is a view in section similar to FIG. 7 showing the dual compartment conduit attached to the connector;

FIG. 9A is a view in section taken at line 9A—9A of FIG. 9;

FIG. 9B is a view in section taken at line 9B—9B of FIG. 9;

FIG. 10 is a view in elevation of a coupler for dual compartment conduit according to the invention; and FIG. 11 is a view in elevation of an end plug according to the invention for dual compartment hose.

DETAILED DESCRIPTION OF SEVERAL EMBODIMENTS

With reference to the drawing, FIG. 1 shows a coupling or connector 20 embodying the principles of the present invention as it appears before being attached to a tubular conduit or hose. In general, it is comprised of two major components, namely a male member 22 and a female locking member 24, both of which are preferably made of a suitable plastic material that is rigid or semi-rigid, such as polyvinylchloride. The male member is comprised of a tubular body portion 26 of constant diameter, one end of which is formed with an enlarged portion having a series of stages or portions with different degrees of conical taper. The embodiment of FIG. 1 is particularly adapted for use with conventional conduit or tubing such as plastic hose 25 used in drip irrigation systems. It has a first stage 28, starting from its outer end which has a slightly smaller diameter than the inside diameter of the conduit or hose to which it will connect. This stage thereby forms a slip fit with the conduit and is of sufficient length to guide the conduit straight onto the connector.

Adjacent the first stage is a second stage 30 which is fairly short and has a conical taper that increases in diameter fairly rapidly (e.g. 30°) to a third stage 32. This third stage is essentially cylindrical and has a diameter that is large enough to produce a slight interference between the hose or conduit and the male member and to cause the hose to expand by the amount of interference. The amount of expansion or interference depends on the mechanical properties of the hose material. For example, for polyethylene hose or conduit, commonly used in drip irrigation systems, the amount of expansion should be about 4% of the hose inside diameter to prevent stress cracking in the hose by over stretching. A fourth stage 34 of the enlarged portion of the male member is a conical section having an angle of taper substantially less than that of the second stage 30 (e.g. 7½°). This latter stage provides a longer conical section that forms a locking surface which cooperates with the female member 24 to form a fluid shut-off or sealing function. A fifth stage 36 on the male member is the cylindrical surface of the body portion 26, and it has a somewhat smaller diameter than the first stage 28 so as to clear the inside of the hose after it has been compressed by the female locking sleeve 24. A sixth stage of the male member is a cylindrical portion 38 of substantially greater diameter than the first stage and thereby forms a shoulder 40 which provides a stop for the female locking sleeve member.

Again, referring to FIGS. 1 and 2, the female locking member 24 has an annular sleeve portion 42 and a plurality of projections 44 that extend axially or parallel to the centerline of the sleeve portion. The latter has a first internal stage 46 which is a conical surface that is convergent inwardly from the end of the sleeve portion at a fairly substantial angle (e.g. 30°). This first stage thus serves to guide the hose as it is moved into the sleeve portion and around the male member. A second conical stage 48 continues inwardly from the first stage and is also convergent but at a lesser angle of taper than the first stage. This angle of taper of the second stage is the same as or it may be even slightly less than that of the fourth stage 34 of the male member so that in combination, the surfaces 48 and 34 produce a wedging action on the hose when it is between the surfaces and filled with fluid or being pulled. At the small end of this second stage 48, the diameter of the sleeve portion is slightly less than and thus provides interference with the outside diameter of the hose. Thus, at this point the sleeve will cause the hose to compress by the amount of interference. For polyethylene, the amount of compression should be about 6% of the hose inside diameter for ease of assembly.

A third stage on the female locking member 24 are the projections 44 which are long enough to allow the end of the attaching hose to extend well past the compression area, namely the third stage 32 of the male member. The inside surfaces 50 of these projections have a diameter equal to the small end of the second stage of the sleeve portion. As shown, the female member 24 of the connector 20 has three projections, but any desired number of projections may be used, and the spaces 52 formed between them allow for visual observation of the hose installation, which is important in order to assure a proper interconnection. At the end of each projection is a hook-like portion 54 that extends radially inwardly. The inside of each hook-like portion forms a shoulder 56 which serves as a stop for the end of the hose being attached. Each hook-like portion tapers to a narrow edge along a circumference having a diameter that is slightly smaller than the maximum outside diameter of the male member. This allows the female locking member to be pressed onto the male member to provide a single unit assembly comprised of the two components, an assembly step that may be readily accomplished by the factory.

When the coupling 20 is to be used, the end of a hose 25 to be connected (as shown in FIGS. 3 and 3A) is pushed onto the male member 22 between it and the sleeve portion of the female member 24 until the hose bottoms against the shoulder stops 56 on the projections 44. The hose is initially guided by the cylindrical stage 28, then is expanded by the conical surface 30 and stretched by the cylindrical surface 32. As it moves further onto the male member 22, it is first deflected inwardly by the conical inner sleeve surface 46 and then forced along the lesser tapered surface 48 until it bears against the projection shoulders 56. When fluid pressure is increased within the hose by application of normal pressure or when the hose is being pulled, the hose tends to move axially off of the male member. (See FIGS. 4 and 4a). When this occurs, the wedging action of the conical surfaces 34 and 48 pulls the sleeve portion 42 of the female member 24 against the hose and compresses it between these surfaces. The greater the fluid pressure the more locking force is created. When it becomes necessary to unlock and remove the hose, the hose 25 and sleeve are merely moved back against the shoulder 40 to release the locking force of the sleeve on the hose and allow its removal.

In FIG. 5, an in-line drip emitter 60 is shown utilizing couplings or connectors 20 as described to facilitate the rapid installation of such emitters in a conduit for a drip irrigation system. Here, each connector is formed as an integral part of the emitter which is preferably molded from a plastic such as polypropylene. The particular emitter shown is described in greater detail in U.S. Pat. No. 3,806,036. Obviously, the coupling 20 could also be used with other forms of emitters as well as with other conduit fittings. For example, in FIG. 6, a coupler 62 for joining two pieces of conduit is shown which comprises essentially an annular central flange 64 with a connector 20 extending from each of its opposite sides. The surface of each side of the flange serves as the limiting stop against which the projections 44 of the female member must bear when a hose is being connected to the male member.

An end fitting 66 for terminating a conduit with a connector 20 is shown in FIG. 7. Again, it comprises a central, disc-like flange 68 (with no opening) from one side of which extends a male connector member 22 and an attached female connector member 24. This fitting provides a way to close off a conduit with a fitting which is easily and quickly installed. Other fittings such as tees, elbows or crosses may also utilize connectors 20 according to the invention.

While the connector 20 described above and shown in FIG. 1 is adaptable for use in drip irrigation systems using emitters such as shown in FIG. 5, a somewhat modified form of connector embodying principles of the present invention may be used with dual-compartment hose or conduit, designated by numeral 70 in FIG. 9B, for drip irrigation systems that do not utilize separate emitters. In such conduit, water is supplied to the main compartment 72 that is connected by small, spaced apart orifices in a dividing wall to a smaller, parallel side compartment 74 which has small drip openings at spaced intervals to the outside. When sections of such conduit are connected to a fitting, the smaller compartment must be pinched off or sealed completely and this is accomplished by a modified connector 20a shown in FIG. 8.

In most respects the connector 20a is similar to the connector 20. However, on its male member 22a instead of having a cylindrical first stage and a narrow conical second stage, it preferably has an elongated first stage 30a with a conical taper that extends to a narrow expansion stage 32a. The purpose of the longer tapered surface 30a is to enable the connector 20a to be more easily inserted into the somewhat more flexible dual compartment hose. As shown in FIGS. 8A and 8B, a female connector member 24a has a sleeve portion 42a with axially extending projections 44a similar to the female connector member for the connector 20. However, the female connector member 24a has a cutout slot 76 in its sleeve portion formed by parallel sidewalls which are only slightly wider apart than the width of smaller compartment 74 for the dual compartment conduit 70 being attached. Extending across the inner end of this cutout area is a narrow arcuate pressure member 78 that projects radially inwardly and has an inner, arcuate surface 80. Along the front of this arcuate member is a conical surface 82 that tapers inwardly toward the connector axis and helps to guide the two compartment conduit 70 between the female and male members 22a and 24a.

When the connector 20a is attached to the end of a two compartment conduit, as shown in FIG. 9, the outer wall forming the smaller fluid compartment is cammed inwardly by the edge surface 82 and is forced under the pressure surface 80 until it extends to the ends of the projections 44a. As fluid pressure builds up within the conduit, the female sleeve portion 42a of the connector 20a is forced back against the outer walls of the conduit around the enlarged expansion portion of the male member. This seals off the end of the secondary compartment 74 of the conduit as well as around the conduit itself.

As with the connector 20, the connector 20a may be utilized as an integral part of a conduit coupler 62a, as shown in FIG. 10, or as an end plug 66a, as shown in FIG. 11. Also, this form of connector may be used with other fittings such as tees, crosses and the like for dual compartment conduit 70 wherever required in drip irrigation systems.

In utilizing either embodiment of connector according to the present invention, they may be installed quickly and with remarkable ease without skilled labor or special tools or heat treatment of the conduit used. Moreover, once installed, the connectors 20 and 20a do not exert stresses on the attached conduit which heretofore caused cracking and leaking. Thus, fluid-tight, long lasting connections to various forms of fittings can now be quickly made or such fittings can be readily removed and replaced when necessary without damage to the conduit. The invention thereby provides an important improvement in conduit systems, and in particular, drip irrigation systems.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A coupling device for providing a fluid tight connection with a flexible conduit comprising:

a male member having a cylindrical body portion integral with an enlarged circumferential portion near one end, said enlarged portion having an inner conical surface that diverges toward said one end, a relatively narrow and generally cylindrical surface adjacent said inner conical surface which is only slightly larger in diameter than the conduit to be coupled, and an outer conical surface that converges from said cylindrical surface toward the end of said male member, said male member also including an additional cylindrical tubular portion extending axially from the smaller end of said outer conical surface;

means attached to the other end of said body portion forming a shoulder substantially transverse to the axis of said male member;

a female member attached to and movable on said male member, said female member having an annular sleeve portion with a conical inner surface that diverges from an inner to an outer edge and a plurality of circumferentially spaced apart arms projecting substantially parallel to the axis of said sleeve portion from its said inner edge, said female member having means extending inwardly to a smaller diameter than said enlarged portion of said male member so that it will be retained on and not separated from said male member when not in use as well as when connected to a conduit.

2. A coupling device for providing a fluid tight connection with a flexible conduit comprising:

a male member having a cylindrical body portion integral with an enlarged circumferential portion near one end, said enlarged portion having an inner conical surface that diverges toward said one end, a relatively narrow and generally cylindrical surface adjacent said inner conical surface which is only slightly larger in diameter than the conduit to be coupled, and an outer conical surface that converges from said cylindrical surface toward the end of said male member;

a shoulder attached to the other end of said body portion, said shoulder being substantially transverse to the axis of said male member and comprising an end portion of a drip emitter;

a female member attached to and movable on said male member, said female member having an annular sleeve portion with a conical inner surface that diverges from an inner to an outer edge and a plurality of circumferentially spaced apart arms projecting substantially parallel to the axis of said sleeve portion from its said inner edge, said female member having means extending inwardly to a smaller diameter than said enlarged portion of said male member so that it will be retained on and not separated from said male member when not in use as well as when connected to a conduit.

3. A coupling device for providing a fluid tight connection with a flexible conduit comprising:

a male member having a cylindrical body portion integral with an enlarged circumferential portion near one end, said enlarged portion having an inner conical surface that diverges toward said one end, a relatively narrow and generally cylindrical surface adjacent said inner conical surface which is only slightly larger in diameter than the conduit to be coupled, and an outer conical surface that converges from said cylindrical surface toward the end of said male member;

a shoulder flange attached to the other end of said body portion, said shoulder flange being substantially transverse to the axis of said male member, said male member extending from one side of said shoulder flange to form an end plug;

a female member attached to and movable on said male member, said female member having an annular sleeve portion with a conical inner surface that diverges from an inner to an outer edge and a plurality of circumferentially spaced apart arms projecting substantially parallel to the axis of said sleeve portion from its said inner edge, said female member having means extending inwardly to a smaller diameter than said enlarged portion of said male member so that it will be retained on and not separated from said male member when not in use as well as when connected to a conduit.

4. A coupling device for providing a fluid tight connection with a flexible conduit comprising:

a male member having a cylindrical body portion integral with an enlarged circumferential portion near one end, said enlarged portion having an inner conical surface that diverges toward said one end;

means attached to the other end of said body portion forming a shoulder substantially transverse to the axis of said male member;

a female member attached to and movable on said male member, said female member having an annular sleeve portion with a conical inner surface that diverges from an inner to an outer edge and a plurality of circumferentially spaced apart arms projecting substantially parallel to the axis of said sleeve portion from its said inner edge, said female member having means extending inwardly to a smaller diameter than said enlarged portion of said male member so that it will be retained on and not separated from said male member when not in use as well as when connected to a conduit, and said sleeve portion of said female member having a recessed notch extending axially from its outer edge and a radially inwardly projecting arcuate pressure member extending across said notch for pinching off and sealing one compartment of a two compartment conduit when it is connected to the coupling device.

5. The coupling device as described in claim 4 wherein said means forming a shoulder comprises a flange member having a center opening;

a pair of male members axially aligned with and extending from opposite sides of said flange member to form a conduit coupler.

6. The coupling device as described in claim 4 wherein said means forming a shoulder comprises a flange member; said male member extending from one side of said flange member to form an end plug.

* * * * *